US011115912B1

(12) United States Patent
Paczkowski et al.

(10) Patent No.: US 11,115,912 B1
(45) Date of Patent: Sep. 7, 2021

(54) DISTRIBUTED LEDGER DIRECTORY SERVICE FOR WIRELESS COMMUNICATION NETWORKS

(71) Applicant: T-MOBILE INNOVATIONS LLC, Overland Park, KS (US)

(72) Inventors: Lyle Walter Paczkowski, Mission Hills, KS (US); Tracy Lee Nelson, Overland Park, KS (US); Ronald R. Marquardt, Woodinville, WA (US)

(73) Assignee: Sprint Communications Company L.P., Overland Park, KS (US)

( * ) Notice: Subject to any disclaimer, the term of this patent is extended or adjusted under 35 U.S.C. 154(b) by 153 days.

(21) Appl. No.: 16/653,436

(22) Filed: Oct. 15, 2019

(51) Int. Cl.
*H04W 48/16* (2009.01)
*H04W 48/18* (2009.01)
*H04L 9/08* (2006.01)
*G06F 16/182* (2019.01)

(52) U.S. Cl.
CPC ........ *H04W 48/16* (2013.01); *G06F 16/1824* (2019.01); *H04L 9/0861* (2013.01); *H04W 48/18* (2013.01); *H04L 2209/38* (2013.01)

(58) Field of Classification Search
CPC .... G06F 16/1865; G06F 3/0659; G06F 15/16; H04L 9/0637; H04L 9/083; H04L 63/0838; H04L 67/18; H04L 63/08; G16H 40/20; H04W 4/024; H04W 4/029
See application file for complete search history.

(56) References Cited

U.S. PATENT DOCUMENTS

| 9,218,429 | B2 | 12/2015 | Levy |
| 9,332,422 | B2 | 5/2016 | Bai et al. |
| 10,129,108 | B2 | 11/2018 | Vrzic |
| 10,299,128 | B1 | 5/2019 | Suthar et al. |
| 10,361,843 | B1 | 7/2019 | Suthar et al. |
| 2017/0164349 | A1 | 6/2017 | Zhu et al. |
| 2017/0332421 | A1 | 11/2017 | Sternberg et al. |
| 2018/0082043 | A1 | 3/2018 | Witchey et al. |
| 2021/0055885 | A1* | 2/2021 | Strathman ............. G06F 3/0644 |
| 2021/0056082 | A1* | 2/2021 | Hegde ................... H04L 9/0637 |

FOREIGN PATENT DOCUMENTS

WO     2019045737 A1     3/2019

* cited by examiner

*Primary Examiner* — Iqbal Zaidi

(57) ABSTRACT

In a wireless communication network, network circuitry executes wireless network slices that store values for network attributes in distributed ledgers. Access circuitry authorizes directory access for a user and transfers a directory access token to the user. Directory circuitry serves information to the user like slice, ledger, and attribute that are within the scope of the directory access token. The access circuitry authorizes ledger access for the user and transfers a ledger access token. The network circuitry serves attributes and values from the distributed ledgers to the user that are within the scope of the ledger access token.

20 Claims, 8 Drawing Sheets

DISTRIBUTED LEDGER DIRECTORY SERVICE FOR WIRELESS COMMUNICATION NETWORKS

TECHNICAL BACKGROUND

Wireless communication networks provide wireless data services to wireless user devices. Exemplary wireless data services include voice calling, Internet access, media streaming, machine communications, vehicle control, and social networking. Exemplary wireless user devices comprise phones, computers, vehicles, robots, sensors, and drones. The wireless communication networks have wireless access nodes that exchange wireless signals with the wireless user devices using wireless network protocols. Exemplary wireless network protocols include Institute of Electrical and Electronic Engineers (IEEE) 802.11 (WIFI), Long Term Evolution (LTE), Fifth Generation New Radio (5GNR), and Narrowband Internet of Things (NB IoT). The wireless protocols transport user data and network signaling.

To deliver the wireless data services, the wireless access nodes often exchange user data and network signaling with wireless network cores. The wireless network cores host network controllers and gateways. The network controllers exchange network signaling with the wireless user devices, access nodes, and gateways to direct the delivery of the wireless data services. The wireless access nodes and gateways exchange user data to deliver the wireless data services. A group of network controllers and gateways that interact to deliver a wireless data service are sometimes referred to as a wireless network slice. A wireless network slice may have dedicated controllers and gateways or share controllers and gateways with other slices. A wireless network or network slice may be decomposed into subnets that are sometime called network partitions. Some wireless network slices and network partitions use distributed ledgers for data processing and storage.

Distributed ledgers are used to handle transactional data like account balances using a blockchain format. A distributed ledger has multiple geographically-diverse computer nodes that each have a copy of chain code and a copy of data blocks. The computer nodes execute the chain code to test and then build a consensus on the results of chain code execution. For example, multiple computer nodes each execute chain code to determine a user's new balance after a debit and then build a consensus on the new balance before proceeding. Once a consensus is reached, then the computer nodes each store a new data block in their own blockchain database. The data block indicates chain code results and has a hash of the previous data block. The redundancy, consensus, and hashes make the distributed ledger highly reliable, secure, and visible.

The amount of wireless network slices, network partitions, distributed ledgers, and ledger data is proliferating. Unfortunately, mining data from the distributed ledgers in the wireless network slices and partitions is not yet efficient and effective.

TECHNICAL BACKGROUND

In a wireless communication network, network circuitry executes wireless network slices that store values for network attributes in distributed ledgers. Access circuitry authorizes directory access for a user and transfers a directory access token to the user. Directory circuitry serves information to the user like slice, ledger, and attributes that are within the scope of the directory access token. The access circuitry authorizes ledger access for the user and transfers a ledger access token. The network circuitry serves attributes and values from the distributed ledgers to the user that are within the scope of the ledger access token.

DETAILED DESCRIPTION

Figure 1:
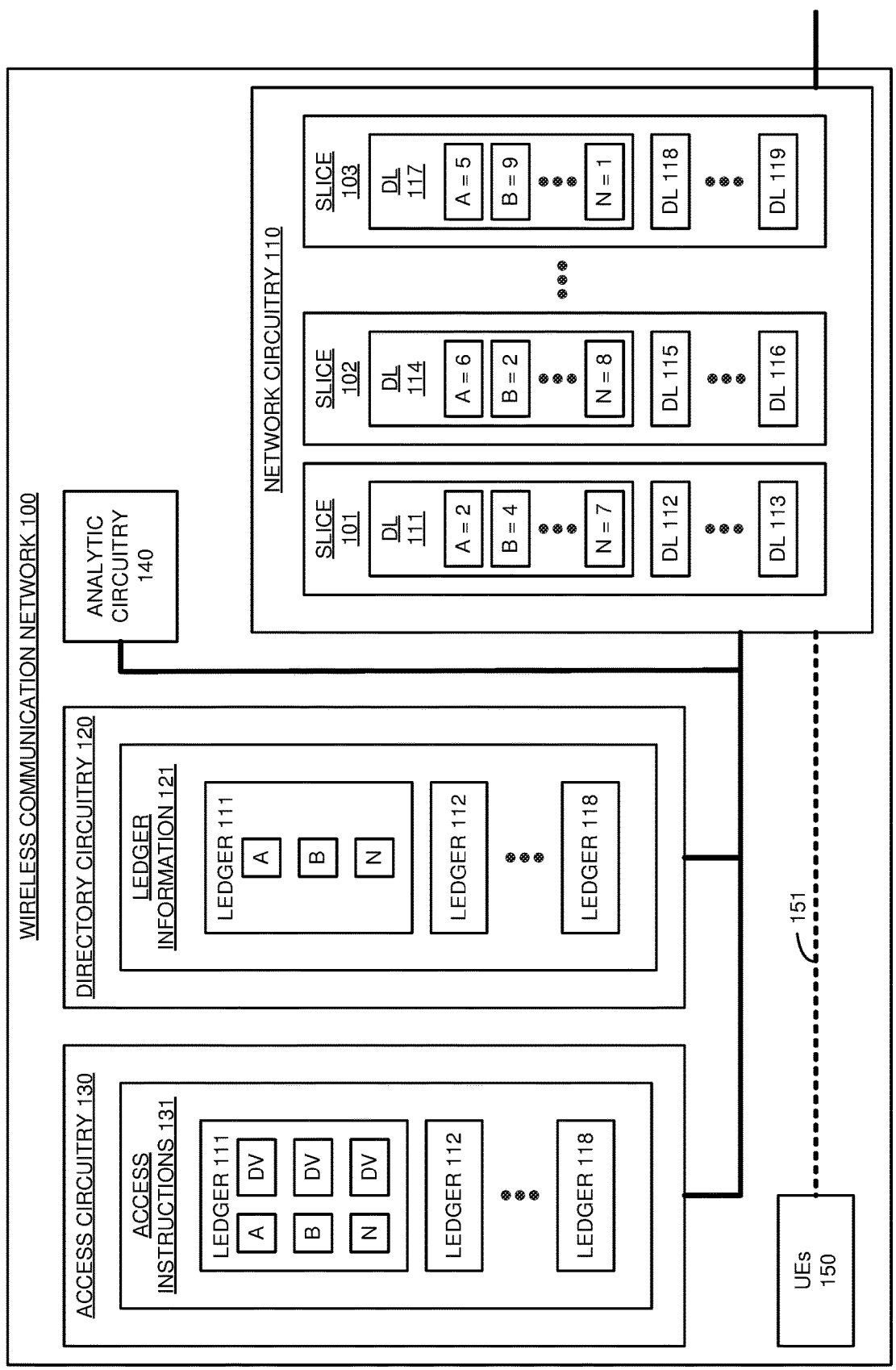
FIG. 1 illustrates a wireless communication network that has a directory service for distributed ledgers in wireless communication slices.

FIG. 1 illustrates wireless communication network 100 that has a directory service for distributed ledgers 111-119 in wireless communication slices 101-103. Wireless communication network 100 comprises network circuitry 110, directory circuitry 120, access circuitry 130, analytic circuitry 140, and User Equipment (UEs) 150. UEs 150 might be phones, computers, robots, sensors, vehicles, drones, data appliances, or some other user apparatus with wireless communication circuitry. UEs 150 and network circuitry 110 are coupled over connection 151 which may comprise a wireless access link, wireless access node, and backhaul data link.

Network circuitry 110 comprises wireless network slices 101-103. Wireless network slice 101 comprises distributed ledgers (DLs) 111-113. Wireless network slice 102 comprises distributed ledgers 114-116. Wireless network slice 103 comprises distributed ledgers 117-119. Distributed ledger 111 stores Attribute-Value Pairs (AVPs) A=2, B=4, and N=7. Distributed ledger 114 stores AVPs A=6, B=2, and N=8. Distributed ledger 116 stores AVPs A=5, B=9, and N=1. Distributed ledgers 112-113, 115-116, and 117-118 store similar AVPs. The attribute letters and numbers are representative, and the number of slices, ledgers, and AVPs has been restricted for clarity. Network circuitry 110 is coupled to directory circuitry 120, access circuitry 130, analytic circuitry 140, and external systems over data links.

Directory circuitry 120 stores ledger information 121. Ledger information 121 characterizes wireless network slices 101-103, distributed ledgers 111-119, and attributes A-N. Ledger information 121 does not usually include the actual data values for the attributes. Directory circuitry 120 is coupled to network circuitry 110 and analytic circuitry 140 over data links.

Access circuitry 130 stores access instructions 131. Access instructions 131 include access rules for analytic circuitry 140 with respect to ledger information 121, wireless network slices 101-103, distributed ledgers 111-119, attributes A-N, and related values. Access circuitry 120 is coupled to network circuitry 110 and analytic circuitry 140 over data links.

Circuitry 110, 120, 130, and 140 comprises microprocessors, memory, software, transceivers, and bus connections. The microprocessors comprise Central Processing Units (CPUs), Graphical Processing Units (GPUs), Application-Specific Integrated Circuits (ASICs), and/or the like. The memories comprise Random Access Memory (RAM), flash circuitry, disk drives, and/or the like. The memories store software like operating systems, network applications, network functions, and virtual components.

The data links may use Institute of Electrical and Electronic Engineers (IEEE) 802.3 (Ethernet), Time Division Multiplex (TDM), Data Over Cable System Interface Specification (DOCSIS), Internet Protocol (IP), IEEE 802.11 (WIFI), Long Term Evolution (LTE), Fifth Generation New Radio (5GNR), Narrowband Internet-of-Things (NB-IoT), or some other data protocol. The wireless links may use WIFI, LTE, 5GNR, NB-IoT, or some other wireless protocol. WIFI, LTE, 5GNR, and NB-IoT may use frequencies in the low-band, mid-band, millimeter-wave band, and/or some other part of the wireless spectrum.

Wireless communication network 100 may be decomposed into subnets. The decomposition is usually based on the amount of traffic between network components, so each subnet is internally "traffic heavy" while the connections between the subnets are "traffic light." To perform decomposition, the network components are clustered into the subnets based on the traffic between network components. The decomposed subnets comprise network partitions of wireless communication network 100. Wireless network slices 101-103 may have several dedicated network partitions or they may share network partitions with other slices. Ledger information 121 characterizes wireless network slices 101-103 and their network partitions.

In operation, network circuitry 110 executes wireless network slices 101-103 and responsively delivers wireless data services to UEs 150. Wireless network slices 101-103 generate data values for attributes A-N to form the AVPs that characterize the wireless network slice operations. Wireless network slices 101-103 store the data values in distributed ledgers 111-119 in association with their network attributes. For example, wireless network slice 102 generates the data value 8 for attribute N and stores the AVP N=8 in distributed ledger 114.

Analytic circuitry 140 transfers a directory access request to access circuitry 130. Access circuitry 130 authorizes the directory access request based on access instructions 131. Access circuitry 130 generates and transfers a directory access token to analytic circuitry 140. The directory access token is encrypted by access circuitry 130 and indicates the access rights and restrictions for analytic circuitry 140 with respect to ledger information 121 in directory circuitry 120. Access instructions 131 may allow analytic circuitry 140 with access to ledger information 121 for specific slices, ledgers, and AVPs. Access instructions 131 may block analytic circuitry 140 from access to ledger information 121 for specific slices, ledgers, and AVPs. For example, analytic circuitry 140 may not get access to ledger information 121 that is related to distributed ledgers 115 and 119.

Analytic circuitry 140 transfers a directory information request and the directory access token to directory circuitry 120. Directory circuitry 120 decrypts the directory access token. Directory circuitry 120 authorizes the directory information request based on the directory access token. The directory information request typically entails an interactive session between analytic circuitry 140 and directory circuitry 120 where search terms and results are exchanged while directory circuitry 120 performs searches on ledger information 121 within the scope of the directory access token to generate the search results. Based on the directory access token, the search may be restricted to ledger information 121 for only some of the slices, ledgers, and attributes. For example, directory circuitry 120 may be blocked from searching ledger information 121 for distributed ledgers 115 and 119 based on the directory access token. Directory circuitry 120 selects ledger information 121 based on the directory information request. For example, directory circuitry 120 may select information about distributed ledger 111 and its attributes B and N based on a series of searches. Directory circuitry 120 transfers the selected ledger information 121 to analytic circuitry 140.

Analytic circuitry 140 processes the selected ledger information 121, and in response, transfers a ledger access request to access circuitry 130. Access circuitry 130 authorizes the ledger access request based on access instructions 131. Access circuitry 130 generates and transfers a ledger access token to analytic circuitry 140. The ledger access token is encrypted by access circuitry 130 and indicates the access rights and restrictions for analytic circuitry 140 with respect to distributed ledgers 111-119 in network circuitry 110. Access instructions 131 may allow analytic circuitry 140 with access to information for specific slices, ledgers, and AVPs. Access instructions 131 may block analytic circuitry 140 form access to information for specific slices, ledgers, AVPs. For example, analytic circuitry 140 may not have access to the data value for attribute B in distributed ledger 114.

Analytic circuitry 140 transfers a ledger information request and the ledger access token to network circuitry 110. Network circuitry 110 decrypts the ledger access token. Network circuitry 110 authorizes the ledger information request based on the ledger access token. The ledger information request typically entails analytic circuitry 140 requesting specific AVPs from specific distributed ledgers 111-119, and network circuitry 110 serving the requested AVPs within the scope of the ledger access token. For example, network circuitry 110 may hide values for attribute B in distributed ledger 111 from analytic circuitry 140. Network circuitry 110 selects AVPs based on the ledger information request. For example, network circuitry 110 may select attributes A and N in distributed ledger 111. Network circuitry 110 transfers the selected AVPs to analytic circuitry 140.

Advantageously, wireless communication network 100 serves analytic circuitry 140 with an efficient and effective directory service for distributed ledgers 111-119 in wireless network slices 101-103. Moreover, analytic circuitry 140 may use the directory service to discover information about network partitions that are associated with wireless network slices 101-103.

Figure 2:
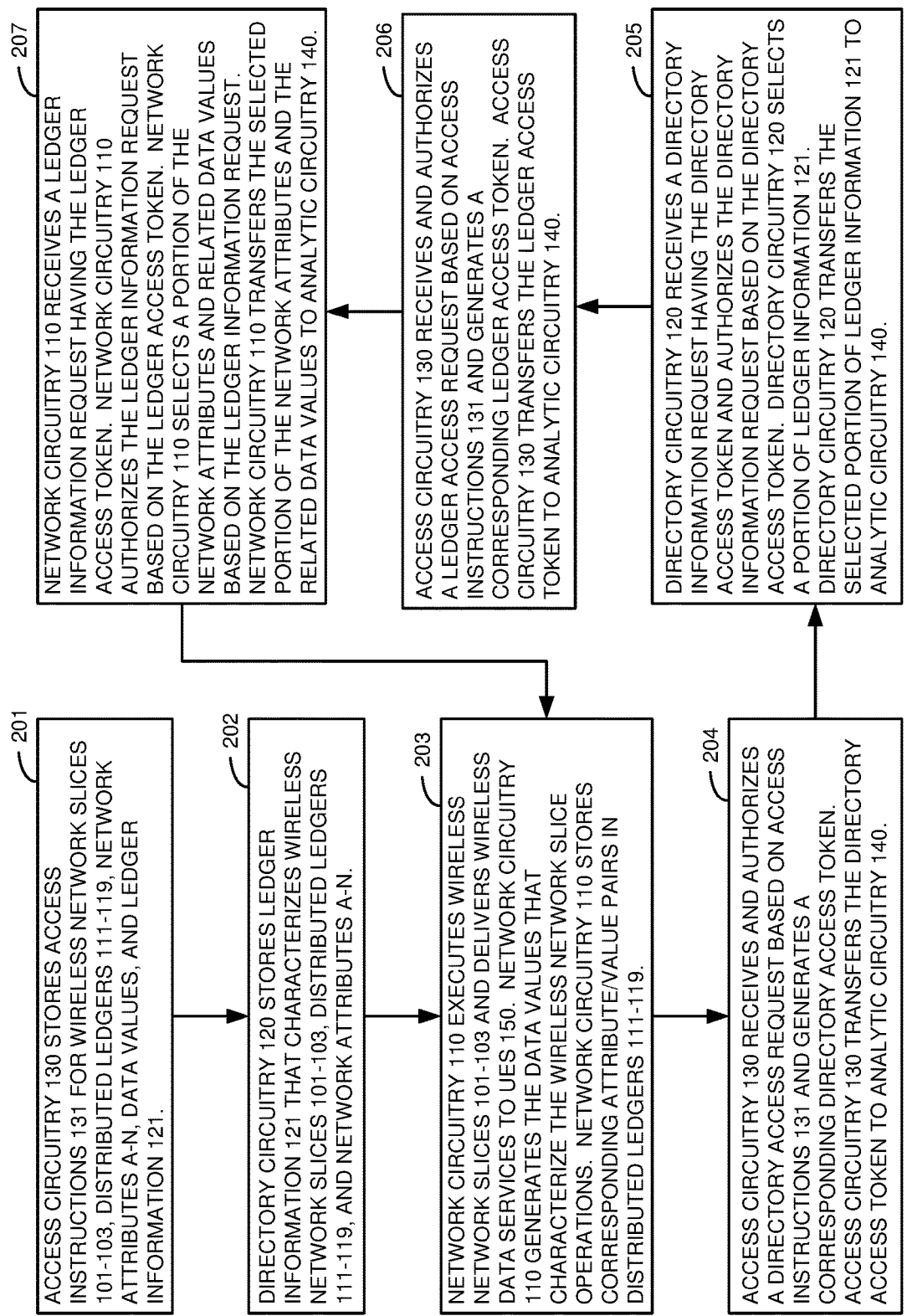
FIG. 2 illustrates the operation of the directory service for the distributed ledgers in the wireless communication slices in the wireless communication network.

FIG. 2 illustrates the operation of the directory service for distributed ledgers 111-119 in the wireless communication slices 101-103 in wireless communication network 100. Access circuitry 130 stores access instructions 131 for wireless network slices 101-103, distributed ledgers 111-119, network attributes A-N, attribute values, and ledger information 121 (201). Directory circuitry 120 stores ledger information 121 that characterizes wireless network slices 101-103, distributed ledgers 111-119, and network attributes A-N (202). Network circuitry 110 executes wireless network slices 101-103 and delivers wireless data services to UEs 150 (203). Network circuitry 110 generates the attribute values that characterize wireless network slice operations (203). Network circuitry 110 stores corresponding AVPs in distributed ledgers 111-119 (203).

Access circuitry 130 receives a directory access request from analytic circuitry 140 (204). Access circuitry 130 authorizes the directory access request based on access instructions 131 and generates a corresponding directory access token (204). For example, access instructions 131 may have different security levels to for data access, and access circuitry 130 would establish the security level for analytic circuitry 140 and then control its data access per the security level. The directory access token indicates available ledger information 121 and/or restricted ledger information 121 for analytic circuitry 140. Access circuitry 130 transfers the directory access token to analytic circuitry 140 (204). Directory circuitry 120 then receives a directory information request having the directory access token and authorizes the directory information request (205). Directory circuitry 120 selects a portion of ledger information 121 within the scope of the directory access token—typically through an interactive search (205). Directory circuitry 120 transfers the selected portion of ledger information 121 to analytic circuitry 140 (205).

Access circuitry 130 receives a ledger access request (206). Access circuitry 130 authorizes the ledger access request based on access instructions 131 and generates a corresponding ledger access token (206). As with directory access, access instructions 131 may control access to distributed ledgers 111-119 using the security levels in a like manner. For analytic circuitry 140, the ledger access token indicates available and/or restricted slices, 101-103, ledgers 111-119, attributes A-N, and attribute values. Access circuitry 130 transfers the ledger access token to analytic circuitry 140 (206). Network circuitry 110 then receives a ledger information request having the ledger access token from analytic circuitry 140 (207). Network circuitry 110 authorizes the ledger information request based on the ledger access token (207). Network circuitry 110 selects a portion of the network attributes and related data values within the scope of the ledger access token and responsive to the ledger information request (207). Network circuitry 110 transfers the selected portion of the network attributes and the related data values (AVPs) to analytic circuitry 140 (207). The operation repeats (203).

Figure 3:
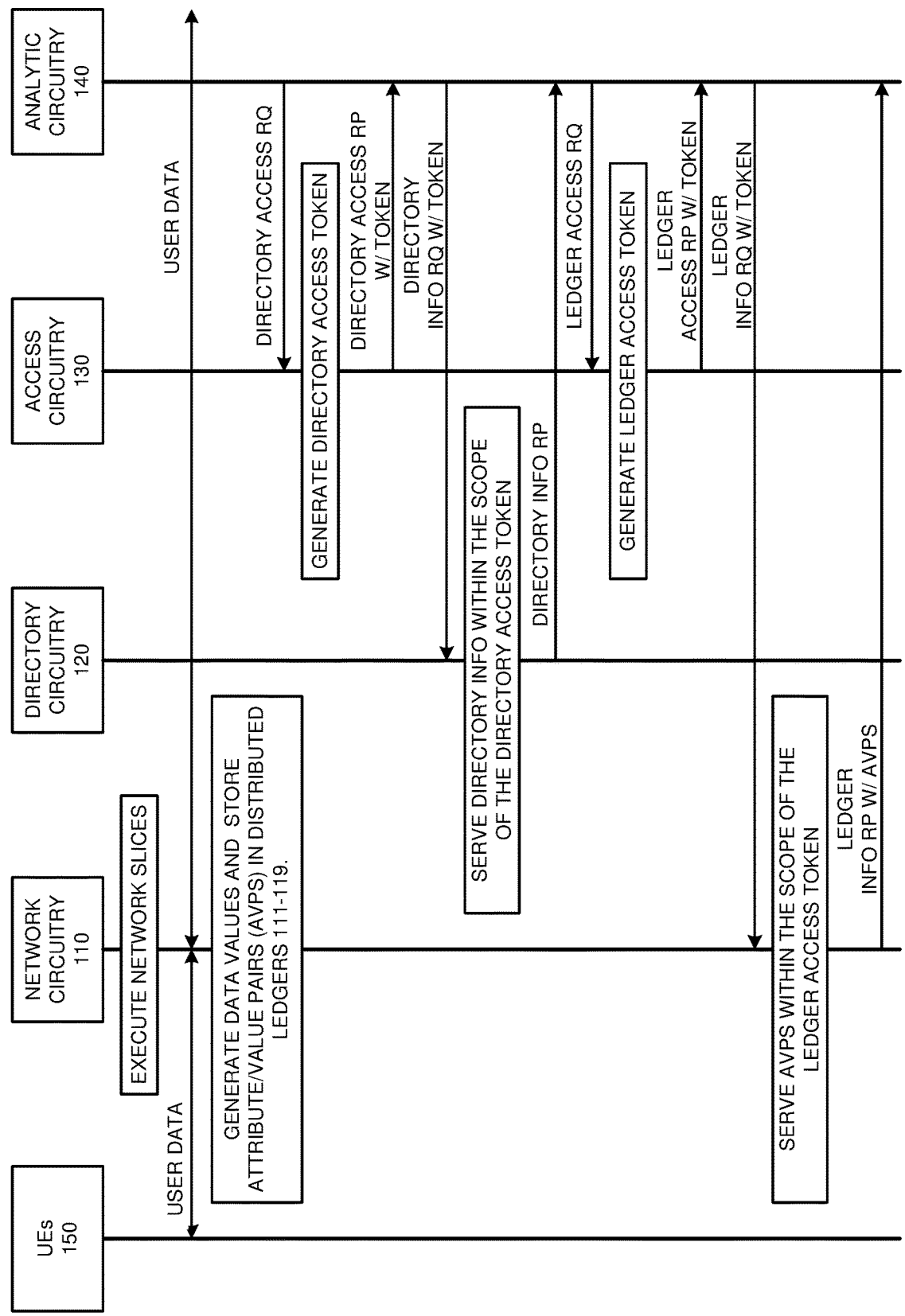
FIG. 3 illustrates the operation of the directory service for the distributed ledgers in the wireless communication slices in the wireless communication network.

FIG. 3 illustrates the operation of the directory service for distributed ledgers 111-119 in wireless communication slices 101-103 in wireless communication network 100. Network circuitry 110 executes wireless network slices 101-103. In response, network circuitry 110 exchanges user data with UEs 150 to deliver wireless data services. Network circuitry 110 exchanges some of the user data for the wireless data services with external systems. Network circuitry 110 generates data values that characterize the wireless network slice operations. Network circuitry 110 stores the values in Attribute/Value Pairs (AVPs) in distributed ledgers 111-119.

Analytic circuitry 140 transfers a directory access request (RQ) to access circuitry 130. Access circuitry 130 authorizes the directory access request based on access instructions 131 and generates a corresponding directory access token. Access circuitry 130 transfers the directory access token to analytic circuitry 140. Analytic circuitry 140 transfers a directory information request and the directory access token to directory circuitry 120. Directory circuitry 120 authorizes and serves the directory information request based on the directory access token. The directory information request typically entails an interactive search session between analytic circuitry 140 and directory circuitry 120 within the scope of the directory access token. Directory circuitry 120 transfers the selected ledger information 121 to analytic circuitry 140.

Analytic circuitry 140 transfers a ledger access request to access circuitry 130. Access circuitry 130 authorizes and serves the ledger access request based on access instructions 131 and generates a corresponding ledger access token. Access circuitry 130 transfers the ledger access token to analytic circuitry 140. Analytic circuitry 140 transfers a ledger information request and the ledger access token to network circuitry 110. Network circuitry 110 authorizes and serves the ledger information request based on the ledger access token. The ledger information request typically entails analytic circuitry 140 requesting specific AVPs from specific distributed ledgers, and network circuitry 110 serving the requested AVPs within the scope of the ledger access token. Network circuitry 110 transfers the selected AVPs to analytic circuitry 140.

Figure 4:
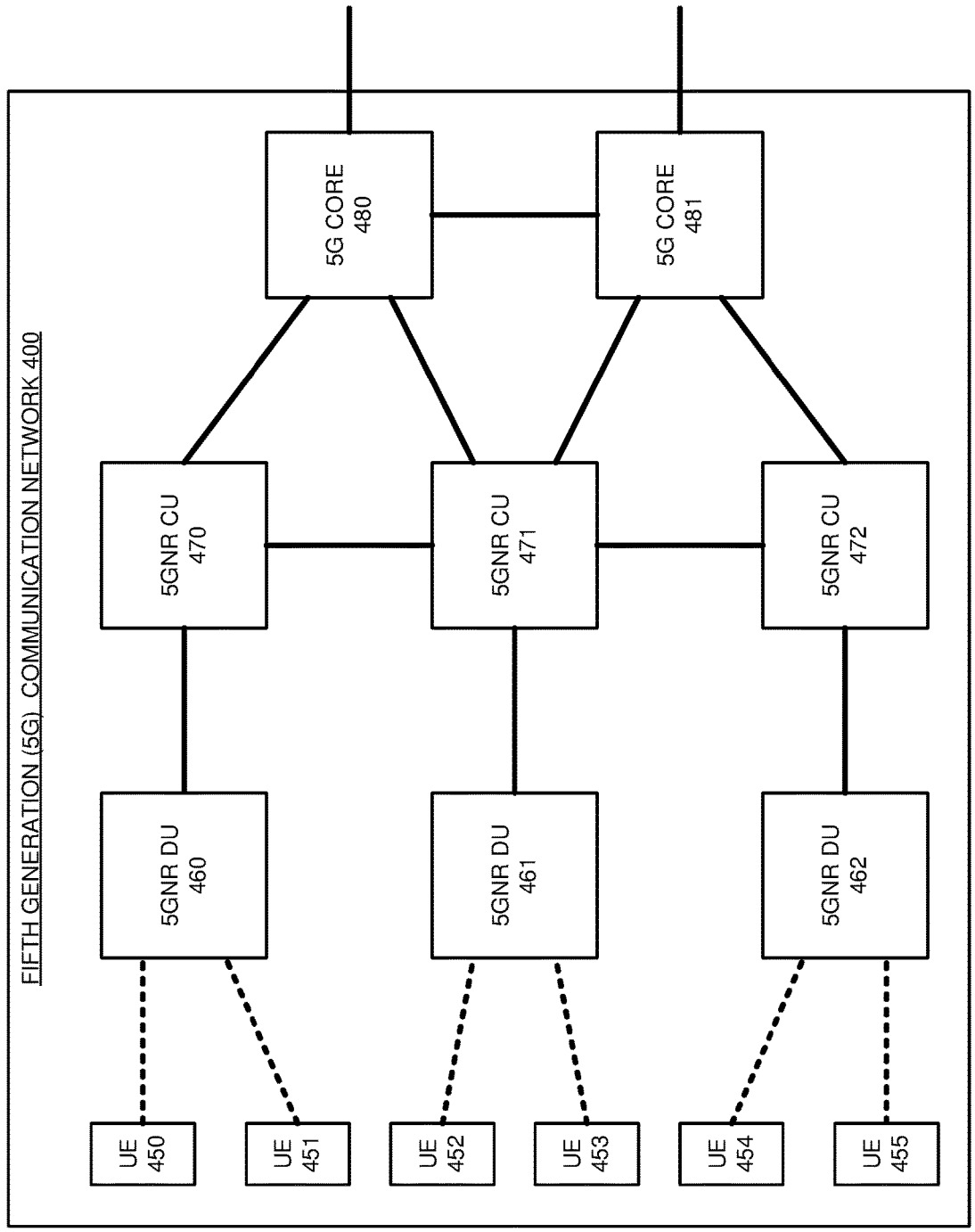
FIG. 4 illustrates Fifth Generation (5G) communication network that has a directory service for distributed ledgers in wireless communication slices.

FIG. 4 illustrates Fifth Generation (5G) communication network 400 that has a directory service for distributed ledgers in wireless communication slices. 5G communication network 400 comprises UEs 450-455, 5G New Radio (NR) Distributed Units (DUs) 460-462, 5GNR Central Units (CUs) 470-472, and 5G cores 480-481. UEs 450-455 and 5GNR DUs 460-462 are coupled over wireless 5GNR links. 5GNR DUs 460-462 are coupled to 5GNR CUs 470-472 over fronthaul links. 5GNR CUs 470-472 and 5G cores 480-481 are coupled over backhaul links. 5G cores 480-481 and external systems are coupled over external data links.

5G cores 480-481 and possibly 5GNR CUs 470-472 execute wireless network slices and responsively deliver wireless data services to UEs 450-455 over 5GNR DUs 460-462 and CUs 470-472. The wireless network slices generate data values for attributes that characterize slice operations. The wireless network slices store the Attribute Value Pairs (AVPs) in distributed ledgers.

5G cores 480-481 host searchable directories of information that characterize the wireless network slices, distributed ledgers, and attributes. The directories do not typically have attribute values. The 5G cores 480-481 issue directory access tokens to control access to the directory information. The wireless network slices in 5G cores 480-481 (and possibly CUs 470-472) have distributed ledgers that host AVPs that characterizes the wireless network slice operations. The 5G cores 480-481 issue ledger access tokens to control access to the ledger AVPs. Thus, 5G cores 480-481 have directories and ledgers that host network AVPs in an accessible but secure manner. In some examples, 5GNR CUs 470-472 have directories and ledgers that host network AVPs like 5G core 580.

Figure 5:
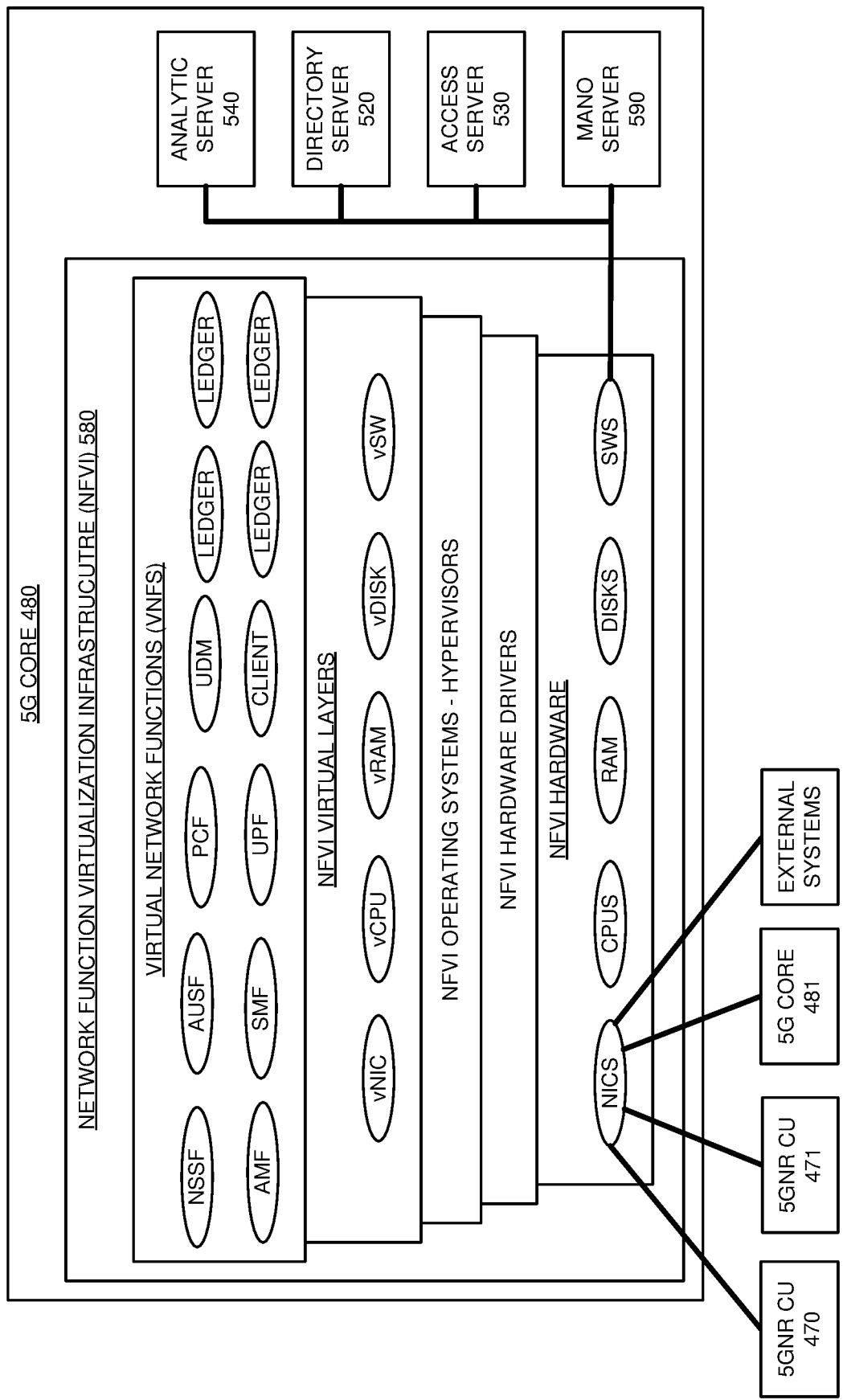
FIG. 5 illustrates a 5G core that has a directory service for distributed ledgers in wireless communication slices.

FIG. 5 illustrates 5G core 480 that supports the directory service for the distributed ledgers in the wireless communication slices in 5G communication network 400. 5G core 480 would be similar. 5G core 480 is an example of circuitry 110, 120, 130, and 140 in wireless communication network 100, although the circuitry in network 100 may differ. 5G core 480 comprises Network Function Virtualization Infrastructure (NFVI) 580, directory server 520, access server 530 analytic server 540, and Management and Orchestration (MANO) server 590. Servers 520, 530, 540, and 590 comprise computer systems with microprocessors, memory, transceivers, bus structures, software, and the like. Analytic server 540 and MANO server 590 are each linked to directory server 520, access server 530, and NFVI 580.

NFVI 580 comprises NFVI hardware, hardware drivers, operating systems and hypervisors, NFVI virtual layers, and Virtual Network Functions (VNFs). The NFVI hardware comprises Network Interface Cards (NICs), CPUs, RAM, disk storage, and data switches (SWS). The virtual layers comprise virtual NICs (vNIC), virtual CPUs (vCPU), virtual RAM (vRAM), virtual Disk Storage (vDISK), and virtual Switches (vSW). The NICs of NFVI 580 are linked to 5GNR CUs 470-471, 5G core 481, and external systems. The SWS of NFVI 580 are linked to analytic server 540 and MANO server 590.

The VNFs in NFVI 580 comprise a distributed ledger client, distributed ledgers, Authentication and Security Function (AUSF), Policy Control Function (PCF), Unified Data Management (UDM). Access and Mobility Management Function (AMF), Network Slice Selection Function (NSSF), Session Management Function (SMF), and User Plane Function (UPF). Other 5G network functions are typically present but are omitted for clarity. The NFVI hardware in NFVI 580 executes the hardware drivers, operating systems, hypervisors, virtual layers, and VNFs to serve UEs 450-454 over CUs 470-471.

Each distributed ledger comprises multiple geographically-diverse computer systems that each host a peer module and ledger database for the distributed ledger. For clarity on FIG. 5, the other geo-diverse computer systems are omitted. The peer nodes of a given distributed ledger are linked over a peer data network. Typically, multiple NFVIs like NFVI 580 host the same distributed ledger where each of the NFVIs host a portion of the endorsers, orderers, peers, and databases that comprise the distributed ledger in the manner of NFVI 580.

MANO server 590 comprises an orchestrator, Virtual Infrastructure Manager (VIM), and VNF Manager (VNFM). The orchestrator interacts with an Operational Support System (OSS) to receive wireless network slice instructions like Network Service Descriptors (NSDs), VNF Forwarding Graphs (VNFFGs), VNF Descriptors (VNFDs), and other MANO control data. The wireless network slice instructions indicate the VNFs and their interconnections—including ledger client VNFs and distributed ledger VNFs and their interconnections to other VNFs and servers 540 and 590. Some of the VNFs in the wireless network slice generate data values that characterize slice operations like usage, transactions, alarms, and the like. The wireless network slice instructions indicate slice metadata, VNF information, ledger attributes, attribute values, and interconnections. The wireless network slice instructions indicate individual security levels for the slice metadata, VNF information, ledger attributes, and ledger attribute values.

The orchestrator in MANO server 590 loads directory server 520 and access server 530 with slice metadata, VNF information, and ledger attributes along with their security levels. The orchestrator directs the VIM in MANO server 590 to drive the NFVI operating systems and hypervisors to execute the VNFs for the wireless network slice. The VIM interacts with the NFVI operating systems and hypervisors which responsively execute and serve the VNFs for the wireless network slice. The orchestrator directs the VNFM in MANO server 590 to communicate with the VNFs in the wireless network slice for support and control. The VNFM interacts with the VNFs in the wireless network slice.

The VNFs in the wireless network slice support data services for UEs 450-454. For example, the UPF may exchange user data packets for UEs 450-454 between 5GNR CUs 470-471 and external systems. The SMF controls the UPF per policies in the PCF. Some of the VNFs in the wireless network slice also generate and transfer data values to the ledger client. The ledger client transfers the data values to the distributed ledgers. The distributed ledgers store the data values in their proper AVPs.

In response to operator control, analytic server 540 transfers a directory access request to access server 530. Access server 530 authenticates analytic server 540 and determines a directory security level for authenticated analytic server 540. Access server 530 authorizes directory access for analytic server 540 based on network slice instructions for the directory security level. Access server 530 generates, encrypts, and transfers a directory access token to analytic server 540. The directory access token indicates access rights and restrictions for analytic server 540 with respect to directory server 520. The access rights allow analytic server 540 to access some ledger information for some of the slices, ledgers, and AVPs. The access restrictions block analytic server 540 from access to ledger information for other slices, ledgers, and AVPs. Analytic server 540 transfers the directory access token to directory server 520. Directory server 520 authenticates analytic server 140 and decrypts the directory access token. Directory server 520 processes the directory access token to control data on the menus and to control the data that is searched. Directory server 520 allows analytic server 540 to view the menus and search data (slice metadata, VNF information, and attributes) per the scope of the directory access token. The operator may then use the menus and search results to request specific AVPs from specific distributed ledgers 111-119 in specific wireless network slices 101-103.

In response to operator control, analytic server 540 transfers a ledger access request to access server 530. Access server 530 authenticates analytic server 540 and determines a ledger security level for analytic server 540. Access server 530 authorizes ledger access for analytic server 540 based on the network slice instructions for the security level. Access server 530 generates, encrypts, and transfers a ledger access token to analytic server 540. The ledger access token indicates access rights and restrictions for analytic server 540 with respect to the wireless network slices, distributed ledgers, and AVPs in NFVI 580. The access rights typically allow analytic server 540 to access some of the slices, ledgers, and AVPs. The access restrictions typically block analytic server 540 from access to some of the slices, ledgers, and AVPs. Analytic server 540 transfers the ledger access token to the client which controls ledger access per the ledger access token. In response to the token, the client retrieves the requested AVPs from the selected ledgers per the scope of the ledger access token. The client transfers the requested AVPs to analytic server 540.

In some examples, UEs like UE 450 and/or external computers are configured with the requisite security information and software to access directory server 520, access server 530, and the ledger client in a similar manner to analytic circuitry 540.

Figure 6:
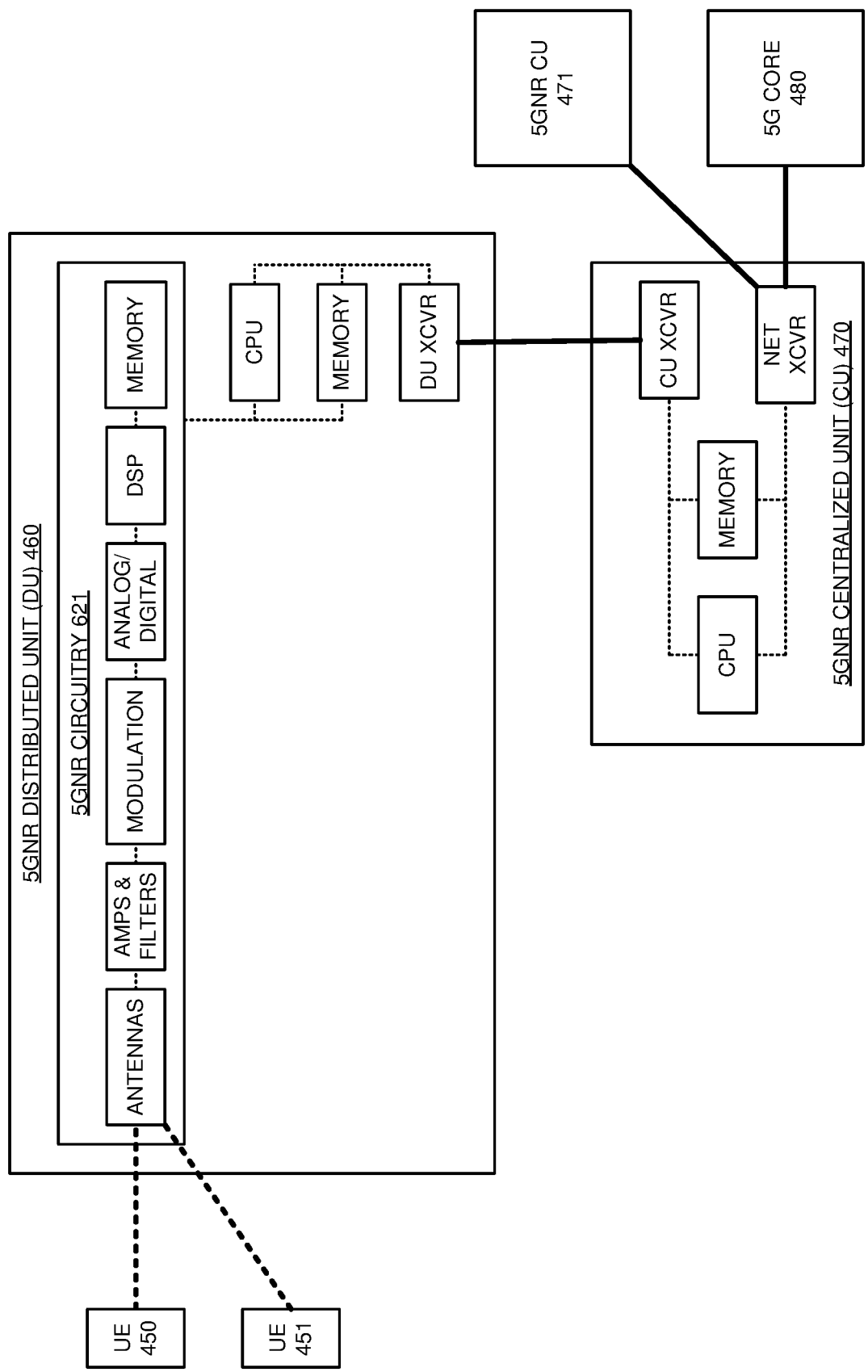
FIG. 6 illustrates a 5G New Radio (5GNR) Distributed Unit (DU) and 5GNR Central Unit (CU) in the 5G communication network.

FIG. 6 illustrates 5GNR Distributed Unit (DU) 460 and 5GNR Central Unit (CU) 470 in 5G communication network 400. 5GNR DU 460 comprises 5GNR circuitry 621, CPUs, memory, and transceivers (XCVR) that are coupled over bus circuitry. 5GNR circuitry 621 comprises antennas, amplifiers (AMPS), filters, modulation, analog-to-digital interfaces, Digital Signal Processors (DSPs), and memory that are coupled over bus circuitry. 5GNR CU 470 comprises CPU, memory, and transceivers that are coupled over bus circuitry.

UEs 450-451 are wirelessly coupled to the antennas in 5GNR circuitry 621 over wireless 5GNR links. The DU transceivers in 5GNR DU 460 are coupled to the CU transceivers in 5GNR CU 470 over fronthaul links. The network transceivers in 5GNR CU 470 are coupled to 5GNR CU 471 over X2 links and to 5G core 580 over backhaul links.

In 5GNR DU 460, the memories store operating systems and network applications. The network applications include at least some of: Physical Layer (PHY), Media Access Control (MAC), Radio Link Control (RLC), Packet Data Convergence Protocol (PDCP), Radio Resource Control (RRC), and Service Data Adaptation Protocol (SDAP). In 5GNR CU 470, the memories store operating systems, virtual components, and network applications. The virtual components comprise hypervisor modules, vNIC, vCPU, vRAM, vDISK, and vSW, and/or the like. The network applications comprise at least some of PHY, MAC, RLC, PDCP, RRC, and SDAP.

The CPU in 5GNR CU 470 executes some or all of the 5GNR network applications to drive the exchange of user data and network signaling between UEs 450-451 and 5G core 480. The CPU in 5GNR DU 460 executes some or all of the 5GNR network applications to drive the exchange of 5GNR data and signaling between UEs 450-451 and 5G core 480. The network application split between 5GNR DU 460 and CU 470 may vary. 5GNR CUs 470-472 may host VNFs under MANO control in the same manner as 5G cores 480-481. Thus, 5GNR CUs 470-472 may host distributed ledgers, ledger clients, ledger directories, and access servers that operate as described herein.

In 5GNR DU 460, the antennas receive wireless signals from UEs 450-451 that transport uplink SDAP data and RRC/N1 signaling. The antennas transfer corresponding electrical uplink signals through duplexers to the amplifiers. The amplifiers boost the received uplink signals for filters which attenuate unwanted energy. In modulation, demodulators down-convert the uplink signals from their carrier frequencies. The analog/digital interfaces convert the analog uplink signals into digital uplink signals for the DSP. The DSP recovers uplink 5GNR symbols from the uplink digital signals. In 5GNR DU 460 and/or CU 470, the CPUs execute the 5GNR network applications to process the uplink 5GNR symbols to recover the uplink RRC/N1 signaling and SDAP data. The RRC network application processes the uplink RRC/N1 signaling and downlink N2/N1 signaling to generate downlink RRC/N1 signaling and uplink N2/N1 signaling. The SDAP network application interworks between SDAP data and N3 data on the uplink/downlink.

The network transceivers in 5GNR CU 470 transfer the uplink N2/N1 signaling and uplink N3 data to 5G core 580 over the backhaul links. The network transceivers in 5GNR CU 470 receive the downlink N2/N1 signaling and downlink N3 data from 5G core 580 over the backhaul links. In 5GNR DU 460 and/or CU 470, the CPUs execute the 5GNR network applications to process the downlink RRC/N1 signaling and downlink SDAP data to generate downlink 5GNR symbols. In 5GNR DU 460, the DSP processes the downlink 5GNR symbols to generate corresponding digital signals for the analog-to-digital interfaces. The analog-to-digital interfaces convert the digital downlink signals into analog downlink signals for modulation. Modulation up-converts the downlink signals to their carrier frequencies. The amplifiers boost the modulated downlink signals for the filters which attenuate unwanted out-of-band energy. The filters transfer the filtered downlink signals through duplexers to the antennas. The electrical downlink signals drive the antennas to emit corresponding wireless 5GNR signals that transport the downlink RRC/N1 signaling and SDAP data to UEs 450-451 over the 5GNR links.

Figure 7:
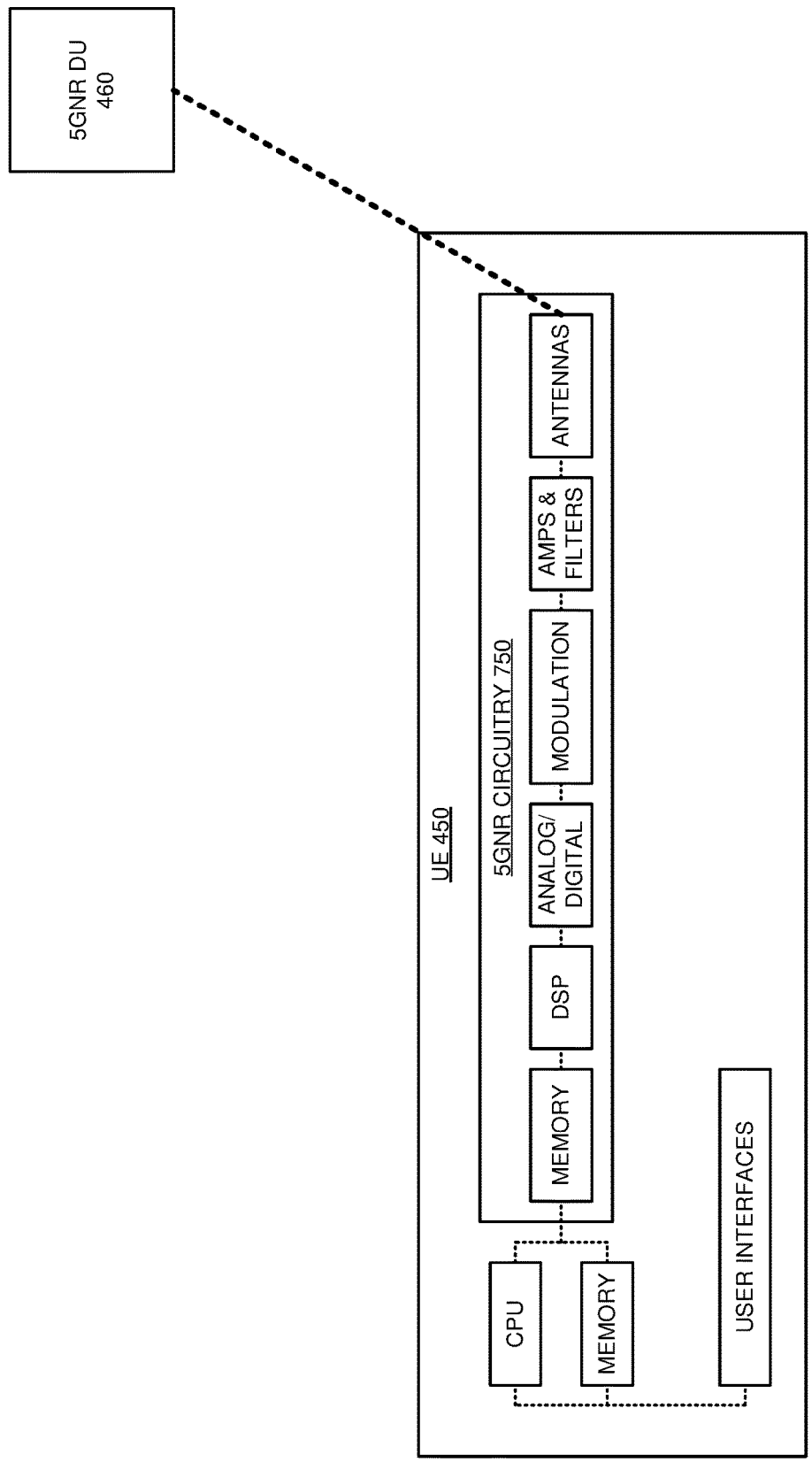
FIG. 7 illustrates a 5GNR User Equipment (UE) in the 5G communication network.

FIG. 7 illustrates 5GNR User Equipment (UE) 450 in 5G communication network 400. UE 450 is an example of UEs 150, although UEs 150 may differ. UE 451 is similar to UE 450. UE 450 comprises 5GNR circuitry 750, CPU, memory, and user interfaces which are interconnected over bus circuitry. 5GNR circuitry 750 comprises antennas, amplifiers, filters, modulation, analog-to-digital interfaces, DSP, and memory that are coupled over bus circuitry. The antennas in UE 450 are coupled to 5GNR DU 460 over wireless 5GNR links. The user interfaces comprise graphic displays, machine controllers, sensors, cameras, transceivers, and/or some other user components. The memories store operating systems, user applications, and network applications. The network applications comprise PHY, MAC, RLC, PDCP, RRC, and SDAP.

The CPU executes the operating systems, user applications, and network applications to exchange RRC/N1 signaling and SDAP data with 5GNR DU 460 over 5GNR circuitry 750 and the 5GNR links. The user applications generate uplink user data and signaling and consume downlink user data and signaling. The network applications process the uplink signaling and downlink RRC/N1 signaling to generate the downlink signaling and uplink RRC/N1 signaling. The network applications interwork between user data and SDAP data on the uplink/downlink. The network applications process the uplink SDAP data and uplink RRC/N1 signaling to generate corresponding uplink 5GNR symbols. In 5GNR circuitry 750, the DSP processes the uplink 5GNR symbols to generate corresponding digital signals for the analog-to-digital interfaces.

The analog-to-digital interfaces convert the digital uplink signals into analog uplink signals for modulation. Modulation up-converts the uplink signals to their carrier frequencies. The amplifiers boost the modulated uplink signals for the filters which attenuate unwanted out-of-band energy. The filters transfer the filtered uplink signals through duplexers to the antennas. The electrical uplink signals drive the antennas to emit corresponding wireless 5GNR signals that transport the uplink RRC/N1 signaling and SDAP data to 5GNR DU 460.

In 5GNR circuitry 750, the antennas receive wireless signals from 5GNR 460 that transport the downlink RRC/N1 signaling and SDAP data. The antennas transfer corresponding electrical downlink signals through duplexers to the amplifiers. The amplifiers boost the received downlink signals for filters which attenuate unwanted energy. In modulation, demodulators down-convert the downlink signals from their carrier frequencies. The analog/digital interfaces convert the analog downlink signals into digital downlink signals for the DSP. The DSP recovers downlink 5GNR symbols from the downlink digital signals. The CPUs execute the 5GNR network applications to process the downlink 5GNR symbols and recover the downlink RRC/N1 signaling and SDAP data. The CPUs transfer corresponding user data and signaling to the user applications. The user applications process the downlink user data and signaling to interact with the user interfaces.

In some examples, UE 450 has user applications that are configured to operate UE 450 like analytic server 440. Thus, UE 450 may obtain directory access tokens from access server 430 to search directory server 420. UE 450 may then obtain ledger access tokens from access server 430 to retrieve select AVPs from the distributed ledgers in 5G core 480 (or 5GNR CU 470).

Figure 8:
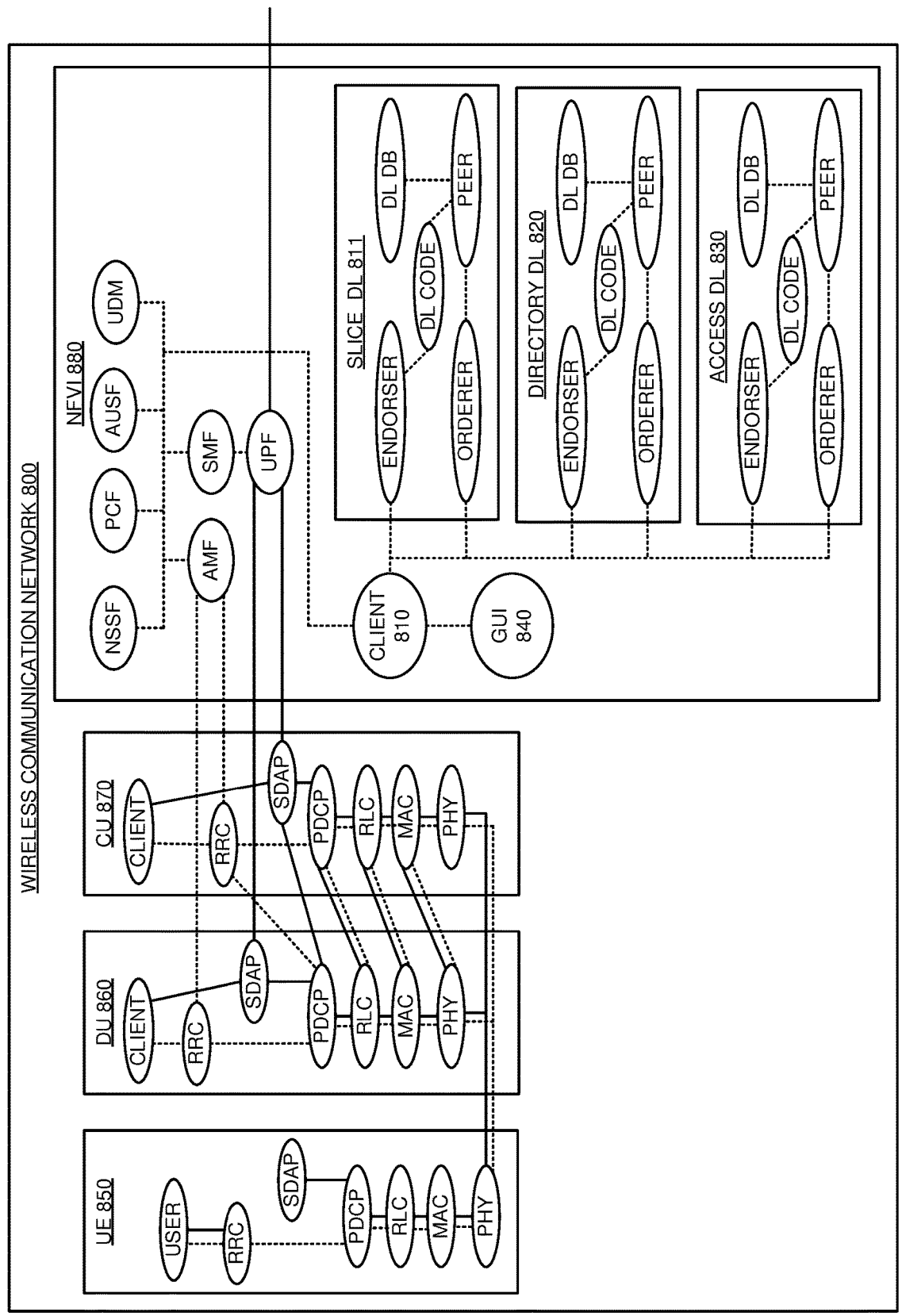
FIG. 8 illustrates the operation of a 5G communication network that has a directory for distributed ledgers in wireless communication slices.

FIG. 8 illustrates the operation of 5G communication network 800 to support a directory service for distributed ledger 810 in a wireless communication slice. Wireless communication network 800 is an example of wireless communication networks 100 and 400, although networks 100 and 400 may differ. Wireless communication network 800 comprises UE 850, DU 860, CU 870, and NFVI 880. NFVI 880 comprises Distributed Ledger (DL) client 810, wireless network slice DL 811, directory DL 820, access DL 830, Graphical User Interface (GUI) 840, NSSF, PCF, AUSF, UDM, AMF, SMF, and UPF. DLs 811, 820, and 830 comprise endorser nodes, orderer nodes, peer nodes, DL code, and DL databases (DB).

Slice DL 811 comprises multiple geographically-diverse computer systems that each host a peer module and ledger database. For clarity on FIG. 8, only one peer node is depicted for DL 811. The peer nodes of DL 811 are linked over a peer data network which is also omitted for clarity. In typical examples, multiple NFVIs and/or CUs host slice DL 811 where each of the NFVIs/CUs host a portion of the endorsers, orderers, peers, and databases that comprise slice DL 811 in the manner of NFVI 880. DLs 820 and 830 are similar.

In wireless communication network 800, a wireless network slice includes the PCF, DL client 810, and slice DL 811. The wireless network slice shares other components with other slices like AMF and SMF. The RRC in UE 850 and the RRC in DU/CU 860/870 exchange 5GNR RRC/N1 signaling over their respective PDCPs, RLCs, MACs, and PHYs. The RRC in DU/CU 860/870 and the AMF in NFVI 880 exchange corresponding 5GNR N2/N1 signaling. The AMF interacts with UE 850 over N1 and with other VNFs like AUSF and UDM to perform UE authentication and security. The AMF interacts with UE 850 over N1 and with other VNFs like PCF and SMF to perform service selection and Quality-of-Service (QoS) determination. The AMF and SMF select bearers and addresses for the selected service and QoS. In response to bearer and address selection, the SMF transfers N4 signaling to the UPF that indicates the selected bearers, QoS, addresses, and other instructions for the selected service for UE 850. The AMF transfers N2 signaling to the RRC in DU/CU 860/870 that indicates the selected bearers, QoS, network addresses, and other service instructions for UE 850. The AMF transfers N1 signaling to the RRC in UE 801. The RRC in DU/CU 860/870 transfers RRC signaling to UE 850 that carries the N1 signaling and that indicates the selected bearers, QoS, network addresses, and other service instructions for UE 850.

The RRC in UE 801 configures its SDAP, PDCP, RLC, MAC, and PHY to communicate with DU 860. The RRC in DU/CU 860/870 configures its SDAP, PDCP, RLC, MAC, and PHY to communicate with UE 850. The SDAP in UE 801 and the SDAP in DU/CU 860/870 exchange user data over their PDCPs, RLCs, MACs, and PHYs. The SDAP in DU/CU 860/870 and the UPF exchange the user data over one or more N3 links. The UPF and an external system exchange the user data over one or more N6 links.

The PCF generates data that characterizes slice operations like the times, locations, services, and QoS for UE 850. The PCF transfers the slice data to client 810. Client 810 transfers the slice data to an endorser node in slice DL 811. The endorser node in slice DL 811 executes its DL code to generate a result (store the data). The endorser node checks the DL code results against an endorsement rule set. The endorser node transfers a transaction endorsement back to client 810. Client 810 transfers the endorsed transaction to an orderer node in slice DL 820. The orderer node transfers the endorsed transaction to the appropriate peer nodes. The peer nodes independently execute their DL code to generate a result (store the data). The peer nodes share their DL code result to form a consensus for the correct result. After consensus, the peer nodes store the slice data in their DL databases using a blockchain format. In some cases, a peer node transfers the result or performs some other task responsive to the result.

GUI 840 generates a directory access request and transfers the directory access request to client 810. Client 810 transfers the directory access request to an endorser node in access DL 830. The endorser node in access DL 830 executes its DL code to generate a directory access token. Thus, the access DL code executes like the access server and access circuitry described herein. The endorser node checks the directory access token against an endorsement rule set. The endorser node transfers a transaction endorsement back to client 810. Client 810 transfers the endorsed transaction to an orderer node in access DL 830. The orderer node transfers the endorsed transaction to the appropriate peer nodes. The peer nodes independently execute their DL code to generate a directory access token. The peer nodes share their DL code result to form a consensus for the correct directory access token. After consensus, the peer nodes store the transaction data in their DL databases using a blockchain format. A peer node transfers the directory access token to client 810. Client 810 transfers a directory access response having the directory access token to GUI 840.

GUI 840 generates a directory information request having the directory access token and search terms. GUI 840 transfers the directory information request to client 810. Client 810 transfers the directory information request to an endorser node in directory DL 820. The endorser node in directory DL 820 executes its DL code to generate search results within the scope of the directory access token. Thus, the directory DL code executes like the directory server and directory circuitry described herein. The endorser node checks the search results against an endorsement rule set. The endorser node transfers a transaction endorsement back to client 810. Client 810 transfers the endorsed transaction to an orderer node in directory DL 820. The orderer node transfers the endorsed transaction to the appropriate peer nodes. The peer nodes independently execute their DL code to generate search results. The peer nodes share their search results to form a consensus for the correct search results. After consensus, the peer nodes store the transaction data in their DL databases using a blockchain format. A peer node transfers the search results to client 810. Client 810 transfers a directory information response having the search results to GUI 840. For example, the search results may indicate that slice DL 811 stores AVPs for network partition "X".

GUI 840 generates a ledger access request and transfers the ledger access request to client 810. Client 810 transfers the ledger access request to an endorser node in access DL 830. The endorser node in access DL 830 executes its DL code to generate a ledger access token. The endorser node checks the ledger access token against an endorsement rule set. The endorser node transfers a transaction endorsement back to client 810. Client 810 transfers the endorsed transaction to an orderer node in access DL 830. The orderer node transfers the endorsed transaction to the appropriate peer nodes. The peer nodes independently execute their DL code to generate a ledger access token. The peer nodes share their ledger access tokens to form a consensus for the correct ledger access token. After consensus, the peer nodes store the transaction data in their DL databases using a blockchain format. A peer node transfers the ledger access token to client 810. Client 810 transfers a ledger access response having the ledger access token to GUI 840.

GUI 840 generates a ledger information request having the ledger access token and requested AVPs. GUI 840 transfers the ledger information request to client 810. Client 810 transfers the ledger information request to an endorser node in slice DL 811. The endorser node in slice DL 811 executes its DL code to retrieve the requested AVPs within the scope of the ledger access token. Thus, the ledger DL code executes like the slice distributed ledgers described herein. The endorser node checks the AVPs against an endorsement rule set. The endorser node transfers a transaction endorsement back to client 810. Client 810 transfers the endorsed transaction to an orderer node in slice DL 811. The orderer node transfers the endorsed transaction to the appropriate peer nodes. The peer nodes independently execute their DL code to retrieve the requested AVPs. The peer nodes share their AVPs to form a consensus for the correct AVPs. After consensus, the peer nodes store the transaction data in their DL databases using a blockchain format. A peer node transfers the requested AVPs to client 810. Client 810 transfers a ledger information response having the AVPs to GUI 840. For example, GUI 840 may receive the requested AVPs for network partition "X".

The wireless data network circuitry described above comprises computer hardware and software that form special-purpose network circuitry to support a directory service for distributed ledgers in wireless communication slices. The computer hardware comprises processing circuitry like CPUs, DSPs, GPUs, transceivers, bus circuitry, and memory. To form these computer hardware structures, semiconductors like silicon or germanium are positively and negatively doped to form transistors. The doping comprises ions like boron or phosphorus that are embedded within the semiconductor material. The transistors and other electronic structures like capacitors and resistors are arranged and metallically connected within the semiconductor to form devices like logic circuitry and storage registers. The logic circuitry and storage registers are arranged to form larger structures like control units, logic units, and Random-Access Memory (RAM). In turn, the control units, logic units, and RAM are metallically connected to form CPUs, DSPs, GPUs, transceivers, bus circuitry, and memory.

In the computer hardware, the control units drive data between the RAM and the logic units, and the logic units operate on the data. The control units also drive interactions with external memory like flash drives, disk drives, and the like. The computer hardware executes machine-level software to control and move data by driving machine-level inputs like voltages and currents to the control units, logic units, and RAM. The machine-level software is typically compiled from higher-level software programs. The higher-level software programs comprise operating systems, utilities, user applications, and the like. Both the higher-level software programs and their compiled machine-level software are stored in memory and retrieved for compilation and execution. On power-up, the computer hardware automatically executes physically-embedded machine-level software that drives the compilation and execution of the other computer software components which then assert control. Due to this automated execution, the presence of the higher-level software in memory physically changes the structure of the computer hardware machines into special-purpose network circuitry to support a directory service for distributed ledgers in wireless communication slices.

The above description and associated figures teach the best mode of the invention. The following claims specify the scope of the invention. Note that some aspects of the best mode may not fall within the scope of the invention as specified by the claims. Those skilled in the art will appreciate that the features described above can be combined in various ways to form multiple variations of the invention. Thus, the invention is not limited to the specific embodiments described above, but only by the following claims and their equivalents.

What is claimed is:

1. A method of operating a wireless communication network that comprises wireless network slices that have distributed ledgers that host network attributes that have data values that characterize wireless network slice operations, the method comprising:
 access circuitry storing access instructions for the distributed ledgers, the network attributes, the data values that characterize the wireless network slice operations, and ledger information that characterizes the distributed ledgers;
 directory circuitry storing the ledger information that characterizes the distributed ledgers and the network attributes;
 network circuitry executing the wireless network slices and responsively delivering wireless data services to wireless User Equipment (UEs), generating the data values that characterize the wireless network slice operations, and storing the data values in the distributed ledgers in relation to corresponding ones of the network attributes;
 the access circuitry receiving and authorizing a directory access request based on the access instructions and transferring a corresponding directory access token;
 the directory circuitry receiving a directory information request having the directory access token, authorizing the directory information request based on the directory access token, selecting a portion of the ledger information that characterizes the distributed ledgers and the network attributes based on the directory information request, and transferring the selected portion of the ledger information;
 the access circuitry receiving and authorizing a ledger access request based on the access instructions and transferring a corresponding ledger access token; and
 the network circuitry receiving a ledger information request having the ledger access token, authorizing the ledger information request based on the ledger access token, selecting a portion of the network attributes and the related data values based on the ledger information request, and transferring the selected portion of the network attributes and the related data values.

2. The method of claim 1 wherein the directory circuitry authorizing the directory information request and selecting the portion of the ledger information comprises restricting directory access to the ledger information for only a portion of the wireless network slices based on the directory access token.

3. The method of claim 2 the directory circuitry authorizing the directory information request and selecting the portion of the ledger information further comprises restricting the directory access to the ledger information for only a portion of the distributed ledgers based on the directory access token.

4. The method of claim 3 wherein the directory circuitry authorizing the directory information request and selecting the portion of the ledger information further comprises restricting the directory access to the ledger information for only a portion of the network attributes based on the directory access token.

5. The method of claim 1 wherein the network circuitry authorizing the ledger information request and selecting the portion of the network attributes and the related data values comprises restricting ledger access to the network attributes and the related data values for only a portion of the wireless network slices based on the ledger access token.

6. The method of claim 5 wherein the network circuitry authorizing the ledger information request and selecting the portion of the network attributes and the related data values further comprises restricting the ledger access to the network attributes and the related data values for only a portion of the distributed ledgers based on the ledger access token.

7. The method of claim 6 wherein the network circuitry authorizing the ledger information request and selecting the portion of the network attributes and the related data values comprises restricting the ledger access to the network attributes and the related data values for only a portion of the network attributes based on the ledger access token.

8. The method of claim 1 wherein the directory circuitry selecting some of the ledger information comprises receiving one or more search terms and searching the ledger information to identify some of the wireless network slices.

9. The method of claim 8 wherein the directory circuitry selecting some of the ledger information further comprises searching the ledger information to identify some of the distributed ledgers.

10. The method of claim 1 wherein at least one of the wireless network slices is associated with a network partition and the selected portion of the ledger information characterizes the network partition.

11. A wireless communication network that comprises wireless network slices that have distributed ledgers that host network attributes that have data values that characterize wireless network slice operations, the wireless communication network comprising:
  access circuitry that stores access instructions for the distributed ledgers, the network attributes, the data values that characterize the wireless network slice operations, and ledger information that characterizes the distributed ledgers;
  directory circuitry that stores the ledger information that characterizes the distributed ledgers and the network attributes;
  network circuitry configured to execute the wireless network slices and responsively deliver wireless data services to wireless User Equipment (UEs), generate the data values that characterize the wireless network slice operations, and store the data values in the distributed ledgers in relation to corresponding ones of the network attributes;
  the access circuitry configured to receive and authorize a directory access request based on the access instructions and transfer a corresponding directory access token;
  the directory circuitry configured to receive a directory information request having the directory access token, authorize the directory information request based on the directory access token, select a portion of the ledger information that characterizes the distributed ledgers and the network attributes based on the directory information request, and transfer the selected portion of the ledger information;
  the access circuitry configured to receive and authorize a ledger access request based on the access instructions and transfer a corresponding ledger access token; and
  the network circuitry configured to receive a ledger information request having the ledger access token, authorize the ledger information request based on the ledger access token, select a portion of the network attributes and the related data values based on the ledger information request, and transfer the selected portion of the network attributes and the related data values.

12. The wireless communication network of claim 11 wherein the directory circuitry is configured to restrict directory access to the ledger information for only a portion of the wireless network slices based on the directory access token.

13. The wireless communication network of claim 12 wherein the directory circuitry is configured to restrict the directory access to the ledger information for only a portion of the distributed ledgers based on the directory access token.

14. The wireless communication network of claim 13 wherein the directory circuitry is configured to restrict the directory access to the ledger information for only a portion of the network attributes based on the directory access token.

15. The wireless communication network of claim 11 wherein the network circuitry is configured to restrict ledger access to the network attributes and the related data values for only a portion of the wireless network slices based on the ledger access token.

16. The wireless communication network of claim 15 wherein the network circuitry is configured to restrict the ledger access to the network attributes and the related data values for only a portion of the distributed ledgers based on the ledger access token.

17. The wireless communication network of claim 16 wherein the network circuitry is configured to restrict the ledger access to the network attributes and the related data values for only a portion of the network attributes based on the ledger access token.

18. The wireless communication network of claim 11 wherein the directory circuitry is configured to receive one or more search terms and search of the ledger information to identify some of the wireless network slices.

19. The wireless communication network of claim 18 wherein the directory circuitry is configured to search of the ledger information to identify some of the distributed ledgers.

20. The wireless communication network of claim 11 wherein at least one of the wireless network slices is associated with a network partition and the selected portion of the ledger information characterizes the network partition.

* * * * *